United States Patent
Park

[11] Patent Number: 5,912,890
[45] Date of Patent: Jun. 15, 1999

[54] STATISTICAL MULTIPLEXING APPARATUS IN A TIME DIVISION MULTIPLEXING BUS

[75] Inventor: Sung-Young Park, Inchun, Rep. of Korea

[73] Assignee: LG Information Communications, Ltd., Seoul, Rep. of Korea

[21] Appl. No.: 08/773,566

[22] Filed: Dec. 27, 1996

[30] Foreign Application Priority Data

Dec. 29, 1995 [KR] Rep. of Korea ............... 95-67182

[51] Int. Cl.$^6$ ........................................... H04J 3/00
[52] U.S. Cl. ........................ 370/375; 370/444; 370/458
[58] Field of Search ........................... 370/360, 375, 370/376, 377, 378, 442, 443, 444, 458, 459, 461, 412, 437

[56] References Cited

U.S. PATENT DOCUMENTS

| | | | |
|---|---|---|---|
| 4,733,390 | 3/1988 | Shirakawa et al. | 370/461 |
| 4,916,692 | 4/1990 | Clarke et al. | 370/451 |
| 5,040,172 | 8/1991 | Mano et al. | 370/362 |
| 5,123,012 | 6/1992 | Suzuki et al. | 370/379 |
| 5,197,125 | 3/1993 | Engel et al. | 370/458 |
| 5,280,482 | 1/1994 | Kitamura et al. | 370/458 |

*Primary Examiner*—Chi H. Pham
*Assistant Examiner*—Kwang B. Yao
*Attorney, Agent, or Firm*—Jacobson, Price, Holman & Stern, PLLC

[57] ABSTRACT

A statistical multiplexing apparatus in a time division multiplexing bus includes a time slot generator for generating a time slot in response to a clock pulse and outputting it to a reception buffer and a time slot determining unit; a transmission buffer for buffering subscriber data and outputting it to a transmission bus via a bus interface unit; the bus interface unit for interfacing the subscriber data output from the transmission buffer to the transmission bus and the data on a reception bus to the reception buffer in response to an enable signal output from the time slot determining unit; the reception buffer for outputting the data from the bus interface unit according to the status of the enable signal output from the time slot determining unit; a transmission determining unit for inputting the output signal of a transmission bus monitoring buffer within the bus interface unit and determining the transmission according to the status of the output clock of the time slot generator; and the time slot determining unit for generating the enable signal which determines the time slot according to the status of the outputs of the transmission determining unit and the time slot generator and then applying it to the bus interface unit

4 Claims, 2 Drawing Sheets

STATISTICAL MULTIPLEXING APPARATUS IN A TIME DIVISION MULTIPLEXING BUS

BACKGROUND OF THE INVENTION

1. Field of the Invention

The present invention relates to a statistical multiplexing apparatus in a time division multiplexing bus, and more particularly to apparatuses for statistically multiplexing in a time division multiplexing bus by using a priority to be appropriate to an asynchronous transfer mode.

2. Description of Related Art

In a conventional time division multiplexing (hereinafter referred to as a "TDM") apparatus as shown in FIG. 1, a plurality of subscriber units $1_1, 1_2, \ldots 1_n$ and a trunk unit 2 are connected via a transmission bus Tx BUS and a reception bus Rx BUS.

Each subscriber unit is comprised of a time slot generator 110 for generating a time slot in response to a clock pulse CLOCK and outputting an enable signal EN to a reception buffer 112 and a bus interface unit 113; a transmission buffer 111 for buffering a subscriber data and outputting it to the transmission bus Tx BUS via the bus interface unit 113; the bus interface unit 113 for interfacing the subscriber data to the transmission bus Tx BUS and the data on the reception bus Rx BUS to the reception buffer 112 in response to the enable signal EN output from the time slot generator 111; and the reception buffer 112 for outputting the data from the bus interface unit 113 according to the status of the enable signal EN output from the time slot generator 110.

The conventional TDM apparatus, as described above, time-divides into n time slots $TS_1$ to $TS_n$, as shown in the TDM bus configuration of FIG. 3, to multiplex n subscribers.

The multiplexing operation will be discussed with reference to FIG. 2. The time slot generator 110 generates the enable signal EN appropriate to the time slot of a corresponding subscriber. The subscriber data is transmitted to the transmission bus Tx BUS via the transmission buffer 111 and the tri-state buffer $BF_1$ within the bus interface unit 113. In this case, the output of the tri-state buffer BF, is controlled by the enable signal EN output from the time slot generator 110.

In the meanwhile, the data input to the reception bus Rx BUS is transferred to the subscriber via the buffer $BF_2$ within the bus interface unit 113 and the reception buffer 112.

However, in a conventional apparatus, the number of the subscribers that one trunk can accommodate is determined by n time slots of the TDM bus. For example, $T_1$ has 24 time slots and $E_1$ has 30 time slots. The more the time slots, the higher the system clock frequency, resulting in the limited number of the time slots.

Another problem is that even when a corresponding subscriber does not transmit any data; the time slot cannot be used by another subscriber, thereby deteriorating the efficiency of the bandwidth.

In order to solve these problems, a conventional technique disclosed in U.S. Pat. No. 5,526,345 proposes a method for statistically multiplexing by managing a leaky bucket manager, a cell buffer and a message cell memory when a plurality of message cells are input and then are output to one output terminal in an asynchronous transfer mode (hereinafter referred to as an "ATM"). However, this technique also has a problem of complicated configuration and lower data processing speed.

SUMMARY OF THE INVENTION

Accordingly, the present invention is directed to a statistical multiplexing apparatus in a TDM bus that substantially obviates one or more of the problems due to limitations and disadvantages of the related art.

An object of the present invention is to provide a statistical multiplexing apparatus in the TDM bus which can efficiently use the bandwidth of a trunk by statistically multiplexing in the TDM bus by using a priority to be appropriate to the asynchronous transfer mode and thus accommodating more subscribers than the bandwidth of the trunk.

Additional features and advantages of the invention will be set forth in the description which follows, and in part will be apparent from the description, or may be learned by practice of the invention The objectives and other advantages of the invention will be realized and attained by the structure particularly pointed out in the written description and claims hereof as well as the appended drawings.

To achieve these and other advantages and in accordance with the purpose of the present invention, as embodied and broadly described, a statistical multiplexing apparatus in a time division multiplexing bus includes a time slot generator for generating a time slot in response to a clock pulse and outputting it to a reception buffer and a time slot determining unit; a transmission buffer for buffering subscriber data and outputting it to a transmission bus via a bus interface unit; the bus interface unit for interfacing the subscriber data output from the transmission buffer to the transmission bus and the data on a reception bus to the reception buffer in response to an enable signal output from the time slot determining unit; the reception buffer for outputting the data from the bus interface unit according to the status of the enable signal output from the time slot determining unit; a transmission determining unit for inputting the output signal of a transmission bus monitoring buffer within the bus interface unit and determining the transmission according to the status of the output clock of the time slot generator; and the time slot determining unit for generating the enable signal which determines the time slot according to the status of the outputs of the transmission determining unit and the time slot generator and then applying it to the bus interface unit.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
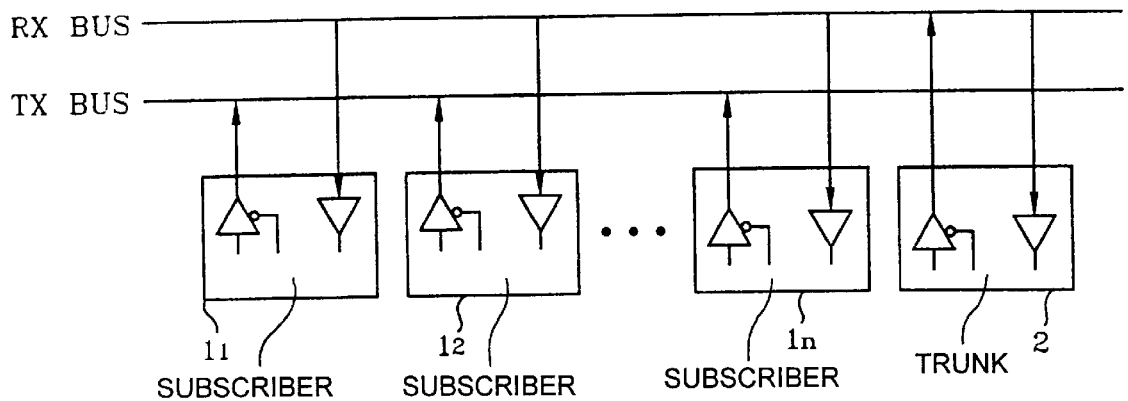
FIG. 1 is a block diagram showing a conventional TDM apparatus.
Figure 2:
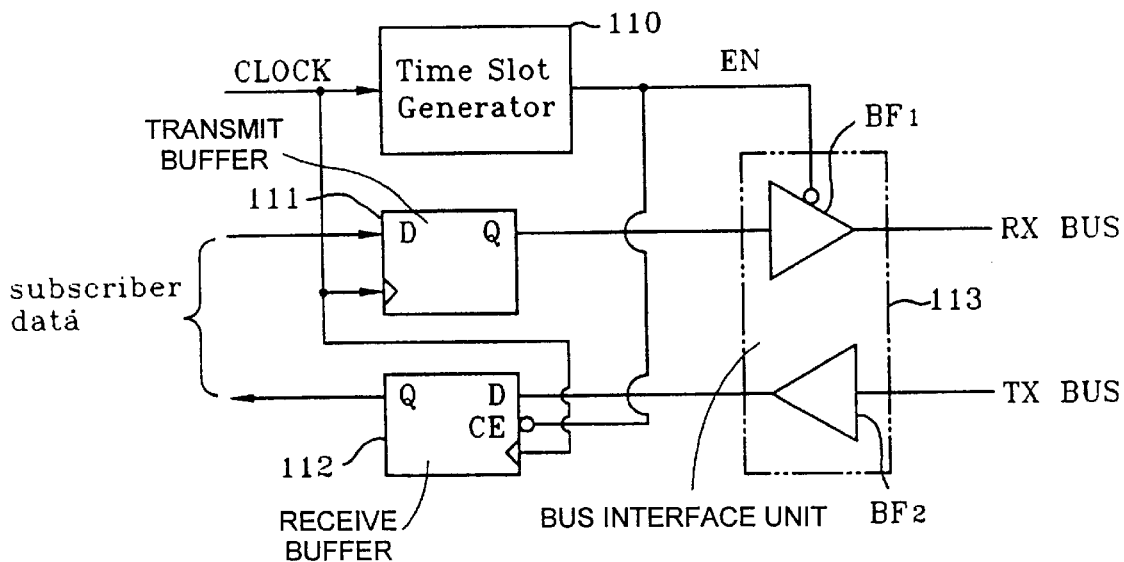
FIG. 2 is a detailed block diagram showing a conventional subscriber unit.
Figure 3:
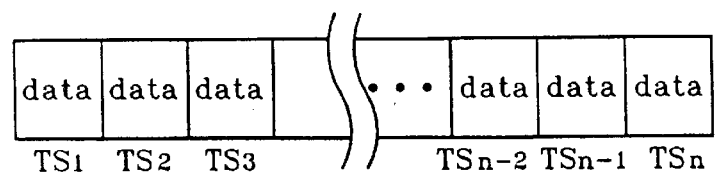
FIG. 3 is a diagram showing configuration of a conventional TDM bus.
Figure 4:
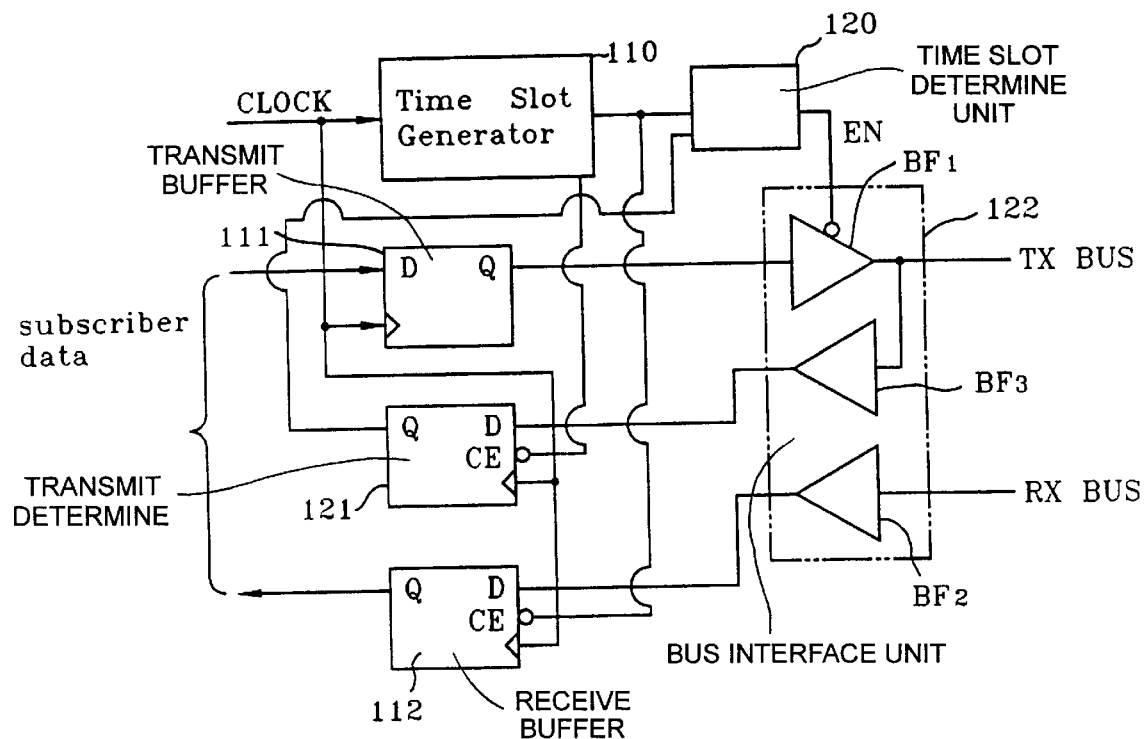
FIG. 4 is a detailed block diagram showing a subscriber unit of a statistical multiplexing apparatus according to the present invention.

FIG. 4 is a detailed block diagram showing a subscriber unit of a statistical multiplexing apparatus according to the present invention. Referring to FIG. 4, the subscriber unit is comprised of a time slot generator 110 for generating a time slot in response to a clock pulse CLOCK and then outputting it to a reception buffer 112 and a time slot determining unit 120; a transmission buffer 111 for buffering subscriber data and outputting it to a transmission bus Tx BUS via a bus interface unit 122; the bus interface unit 122 for interfacing the subscriber data output from the transmission buffer 111 to the transmission bus Tx BUS and the data on the reception bus Rx BUS to the reception buffer 112 in response to an enable signal EN output from the time slot determining unit 120; the reception buffer 112 for outputting the data from the bus interface unit 122 according to the status of the enable signal EN output from the time slot determining unit 120; a transmission determining unit 121 for inputting the output signal of a transmission bus monitoring buffer $BF_3$ within the bus interface unit 122 and determining the transmission according to the status of the output clock of the time slot generator 110; and the time slot determining unit 120 for generating the enable signal EN which determines the time slot according to the status of the outputs of the transmission determining unit 121 and time slot generator 110 and then applying it to the bus interface unit 122.

Figure 5:
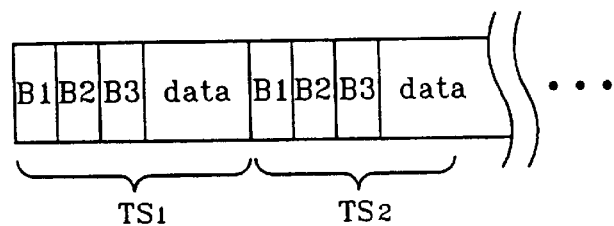
FIG. 5 is a diagram showing configuration of a time slot according to the present invention.

FIG. 5 is a diagram showing configuration of a time slot according to the present invention. As shown in the figure, each time slot $TS_1$, $TS_2$ is comprised of subscriber data and control data $B_1$ to $B_3$. A plurality of subscribers are allotted to one time slot based on a priority and the control data $B_1$ to $B_3$ are controlled by the transmission determining unit 121 and the bus interface unit 122.

The operation and effect of the present invention will be discussed with reference to FIG. 5.

The present invention is featured in that the control data $B_1$ to $B_3$ are added before the subscriber data as shown in FIG. 5.

As many subscribers as the number of the bits of the control data can be designated to one time slot, and for the convenience of description, it is assumed in the present invention that three subscribers are designated to one time slot.

The time slot is allotted to the subscribers in the order of their priority ($B_1$, $B_2$ . . . ), i.e. from the subscriber with the highest priority to the subscriber with the lowest priority.

That is, since the subscriber with the control data $B_1$ is of the highest priority, this subscriber can immediately transmit data to the transmission bus Tx BUS via the transmission buffer 111 and the bus interface unit 122.

In this case, if the time slot is used, the control data $B_1$ bit is set to "0".

If the subscriber with the control data $B_2$ has any data to be transmitted, the buffer $BF_3$ monitors the transmission bus Tx BUS of corresponding time slot and the transmission determining unit 121 determines whether or not the control data $B_1$ bit has been set to "1".

If the control data $B_1$ bit has been set to "1", the control data $B_2$ bit is set to "0" and the transmission is performed simultaneously. This is true for the case of the subscriber with the control data $B_3$.

As described above, the present invention can accommodate more subscribers than the bandwidth of a given trunk by simultaneously processing the subscriber data and the control data in one time slot, allowing an effective use of the bandwidth.

It will be apparent to those skilled in the art that various modifications and variations can be made in the statistical multiplexing apparatus of the present invention without departing from the spirit or scope of the invention. Thus, it is intended that the present invention cover the modifications and variations of this invention provided they come within the scope of the appended claims and their equivalents.

What is claimed is:

1. A statistical multiplexing apparatus in a time division multiplexing bus, comprising:

time slot generating means generating a time slot in response to a clock pulse and outputting the time slot to reception buffer means and time slot determining means, transmission buffer means buffering subscriber transmit data and outputting the subscriber transmit data to a transmission bus vis bus interface means;

said bus interface means interfacing the subscriber transmit data output from said transmission buffer means to said transmission bus and subscriber receive data on a reception bus to said reception buffer means in response to an enable signal output from said time slot determining means;

said reception buffer means outputting the subscriber receive data from said bus interface means according to a status of said enable signal output from said time slot determining means;

transmission determining means inputting the output signal of a transmission bus monitoring buffer within said bus interface means and determining transmission according to the status of the clock pulse of said time slot generating means; and said time slot determining means generating said enable signal which determines the enable signal according to the status of an output of said transmission determining means and the enable signal of said time slot generating means and then applying the enable signal to said bus interface means.

2. The statistical multiplexing apparatus as claimed in claim 1, wherein each time slot is comprised of subscriber data and control data, a plurality of subscribers are allotted to one time slot based on their priority and said control data are controlled by said transmission determining means and said bus interface means.

3. A multiplexing apparatus in a time division multiplexing bus, comprising:

a time slot generator generating a time slot in response to a clock pulse;

a transmission buffer buffering subscriber transmit data and outputting the subscriber transmit data;

a bus interface, in response to an enable signal, receiving the subscriber transmit data output from said transmission buffer and outputting the subscriber transmit data to a transmission bus, the bus interface also receiving subscriber receive data from a reception bus and outputting the subscriber receive data, said bus interface having a transmission bus monitoring buffer with a transmission bus monitoring output;

a reception buffer receiving the time slot output by said time slot generator and the subscriber receive data output from said bus interface and outputting the subscriber receive data from said bus interface in response to said enable signal;

a transmission determining unit receiving the transmission bus monitoring output and determining transmission in response to the clock pulse of said time slot generator; and, a time slot determinating unit receiving the time slot output by said time slot generator, generating the enable signal, and determining the enable signal in response to an output of said transmission determining unit and the time slot of said time slot generator.

4. The multiplexing apparatus as claimed in claim 3, wherein each time slot is comprised of subscriber data and control data, a plurality of subscribers are allotted to one time slot based on their priority and said control data are controlled by said transmission determining unit and said bus interface unit.

* * * * *